(12) United States Patent
Weinberger et al.

(10) Patent No.: US 7,860,822 B1
(45) Date of Patent: Dec. 28, 2010

(54) DISTRIBUTED AGGREGATION MAPPING

(75) Inventors: Benjamin Weinberger, San Francisco, CA (US); William Robinson, Mountain View, CA (US); Misha Zatsman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 479 days.

(21) Appl. No.: 11/874,652

(22) Filed: Oct. 18, 2007

(51) Int. Cl.
*G06F 17/30* (2006.01)
(52) U.S. Cl. .................................. 707/600; 707/608
(58) Field of Classification Search .............. 707/2, 707/10, 102
See application file for complete search history.

(56) References Cited

U.S. PATENT DOCUMENTS

| | | | |
|---|---|---|---|
| 6,064,999 A * | 5/2000 | Dalal ............................. | 707/2 |
| 6,493,708 B1 | 12/2002 | Ziauddin et al. | |
| 6,882,993 B1 | 4/2005 | Lawande et al. | |
| 7,010,523 B2 * | 3/2006 | Greenfield et al. ............. | 707/3 |
| 7,139,783 B2 | 11/2006 | Hinshaw et al. | |
| 7,181,440 B2 * | 2/2007 | Cras et al. ...................... | 707/2 |
| 7,266,549 B2 * | 9/2007 | de Souza et al. ............... | 707/3 |
| 7,469,241 B2 * | 12/2008 | Bellamkonda et al. ......... | 707/2 |
| 7,523,124 B2 * | 4/2009 | Lavdas et al. ............... | 707/101 |
| 7,580,944 B2 * | 8/2009 | Zhuge et al. ................ | 707/102 |
| 2002/0194163 A1 * | 12/2002 | Hopeman et al. .............. | 707/3 |
| 2005/0060300 A1 * | 3/2005 | Stolte et al. .................... | 707/3 |
| 2005/0235001 A1 | 10/2005 | Peleg et al. | |
| 2006/0224564 A1 | 10/2006 | Yu et al. | |
| 2008/0040382 A1 * | 2/2008 | Morris et al. ............... | 707/102 |
| 2009/0019005 A1 | 1/2009 | Hu et al. | |
| 2009/0100336 A1 * | 4/2009 | Powley et al. ............... | 715/700 |

OTHER PUBLICATIONS

"Choosing the Attributes for the Dimension Tables" *IBM Informix Database Design and Implementation Guide* [online] Nov. 2, 2005 <URL: http://publib.boulder.ibm.com/infocenter/idshelp/v10/index.jsp?topic=/com.ibm.ddi.doc/ddi232.htm> [retrieved Aug. 6, 2009], 2 pages.

"The Dimension Tables" IBM Red Brick Warehouse 6.3 Information Center, IBM Corp. [online] Mar. 2004 <URL: http://publib.boulder.ibm.com/infocenter/rbhelp/v6r3/index.jsp?topic=/com.ibm.redbrick.doc6.3/ssg/ssg14.htm> [retrieved Aug. 6, 2009], 2 pages.

"Distributed Hash Table" Wikipedia [online] Jun. 10, 2007 <URL: www.en.wikipedia.org/wild/Distributed_hash_table> [retrieved Jun. 12, 2007], 5 pages.

Fan, Hao et al., "Using AutoMed Metadata in Data Warehousing Environments," DOLAP 2003, ACM Sixth International Workshop on Data Warehousing and OLAP, New Orleans, Louisiana, USA, Nov. 7, 2003, Proceedings, Retrieved from the Internet, URL:<http://www.dcs.bbk.ac.uk/~ap/pubs/dolap03.pdf>, 8 pages.

(Continued)

*Primary Examiner*—Debbie Le
(74) *Attorney, Agent, or Firm*—Fish & Richardson P.C.

(57) ABSTRACT

Processes, systems and computer program products for data management. A distributed map is provided that maps data from a first dimension level in a hierarchy to a second dimension level in the hierarchy. The data is aggregated from the first dimension level to the second dimension level based on the mapping. The distributed map is partitioned across multiple devices.

17 Claims, 4 Drawing Sheets

OTHER PUBLICATIONS

Forsman, Sarah, "OLAP Council White Paper" [online] 1997 <URL: http://www.symcorp.com/downloads/OLAP_CouncilWhitePaper.pdf> [retrieved Aug. 6, 2009], 5 pages.

"Java Programming: Section 12.3 (Map Classes)" Internet FAQ Archive [online] <URL:http://72.14.253.104/search?q=cache:Vxi1WYuu5ncJ:www.faqs.org/docs/javap/c12/s3.html> [retrieved Jun. 12, 2007], 7 pages.

Kimball, Ralph et al., *The Data Warehouse Toolkit Second Edition* (1996), John Wiley and Sons, Inc., ISBN 0-471-20024-7, Chapter 1, pp. 1-19.

"Logical Design in Data Warehouses" *Oracle9i Data Warehousing Guide*, Release 2 (9.2) [online] <URL: http://download.oracle.com/docs/cd/B10501_01/server.920/a96520/logical.htm> [retrieved Mar. 23, 2009], 6 pages.

"OLAP Cube" Wikipedia, the Free Encyclopedia [online]Apr. 24, 2007 <URL: www.en.wikipedia.org/wiki/OLAP_cube>, [retrieved May 15, 2007], 3 pages.

Pike, R. et al. "Interpreting the Data: Parallel Analysis With Sawzall" *Scientific Programming*, vol. 13, No. 4 (2005), pp. 277-298.

Vaisman, Alejandro et al., "A Temporal Query Language for OLAP: Implementation and a Case Study" *DBPL 2001*. Rome, Italy, Sep. 2001, pp. 78-96.

Weir, Rob et al., "Best Practice for Implementing a Data Warehouse: A Review for Strategic Alignment" *DMDW 2003*, Berlin, Germany [online] <URL: http://sunsite.informatik.rwth-aachen.de/Publications/CEUR-WS//Vol-77/05_Weir.pdf> [retrieved Aug. 6, 2009], 14 pages.

USPTO Examiner Debbie Le, First Action Interview Pilot Program Communication for U.S. Appl. No. 11/874,668, filed Apr. 6, 2010, 7 pages.

* cited by examiner

DISTRIBUTED AGGREGATION MAPPING

TECHNICAL FIELD

This invention relates to data management.

BACKGROUND

A data warehouse can receive new data continually, in batches, periodically or sporadically. A data warehouse client may require aggregation of the new data, for example, to generate reports or other meaningful information from the raw data. Accordingly, calculating aggregated values must occur periodically to account for the receipt of new data. Data aggregation can require a mapping from one set of data to another set of data. Large volumes of data or sparse data can result in an unwieldy aggregation map, for example, if using a conventional array.

SUMMARY

This invention relates to data management. In general, in one aspect, the invention features methods, systems and computer program products wherein a distributed map is provided mapping data from a first dimension level in a hierarchy to a second dimension level in the hierarchy. The data is aggregated from the first dimension level to the second dimension level based on the mapping. The distributed map is partitioned across a plurality of devices.

Implementations of the invention can include one or more of the following features. Aggregating data can include sending a request to a first device in the plurality of devices, where the first device contains data required for the aggregation. Sending a request to the first device can require including the request in a batch of requests sent together to the first device. In one implementation, the distributed map is an in-memory-map distributed across the plurality of devices. In another implementation, the distributed map is implemented as distributed disk-based maps across the plurality of devices.

New data can be received in the first dimension level of the hierarchy and the distributed map can be periodically recreated to include new data. The distributed map can be implemented as distributed hash tables. The plurality of devices can include a plurality of different physical devices and/or a plurality of different logical devices.

In general, in another aspect, the invention features a system including a plurality of devices. Each device is operable to store a subset of a distributed map mapping data from a first dimension level in a hierarchy to a second dimension level in the hierarchy. Each device is further operable to provide data mapped by the distributed map to an aggregation device in response to a request for the data. The aggregation device is configured to send a request to one of the plurality of devices for data, and aggregate data from the first dimension level to the second dimension level in the hierarchy.

Implementations of the invention can realize none, one or more of the following advantages. Large volumes of data can be efficiently mapped for aggregating from one level of granularity to another. Partitioning the aggregation map removes machine-driven limitations on the size of an aggregation map. Because large volumes of data can be efficiently mapped, the data warehouse can handle larger dimensions than would be possible without a distributed aggregation map.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Techniques, computer programs and a system for aggregating data are described. Aggregating large volumes of data, or sparse data, can require a large aggregation map that may be impractical for conventional system requirements, e.g., memory capacity. A distributed map is described that can be used to maintain massive and/or sparse aggregation maps without degrading data aggregation or query performance.

Figure 1:
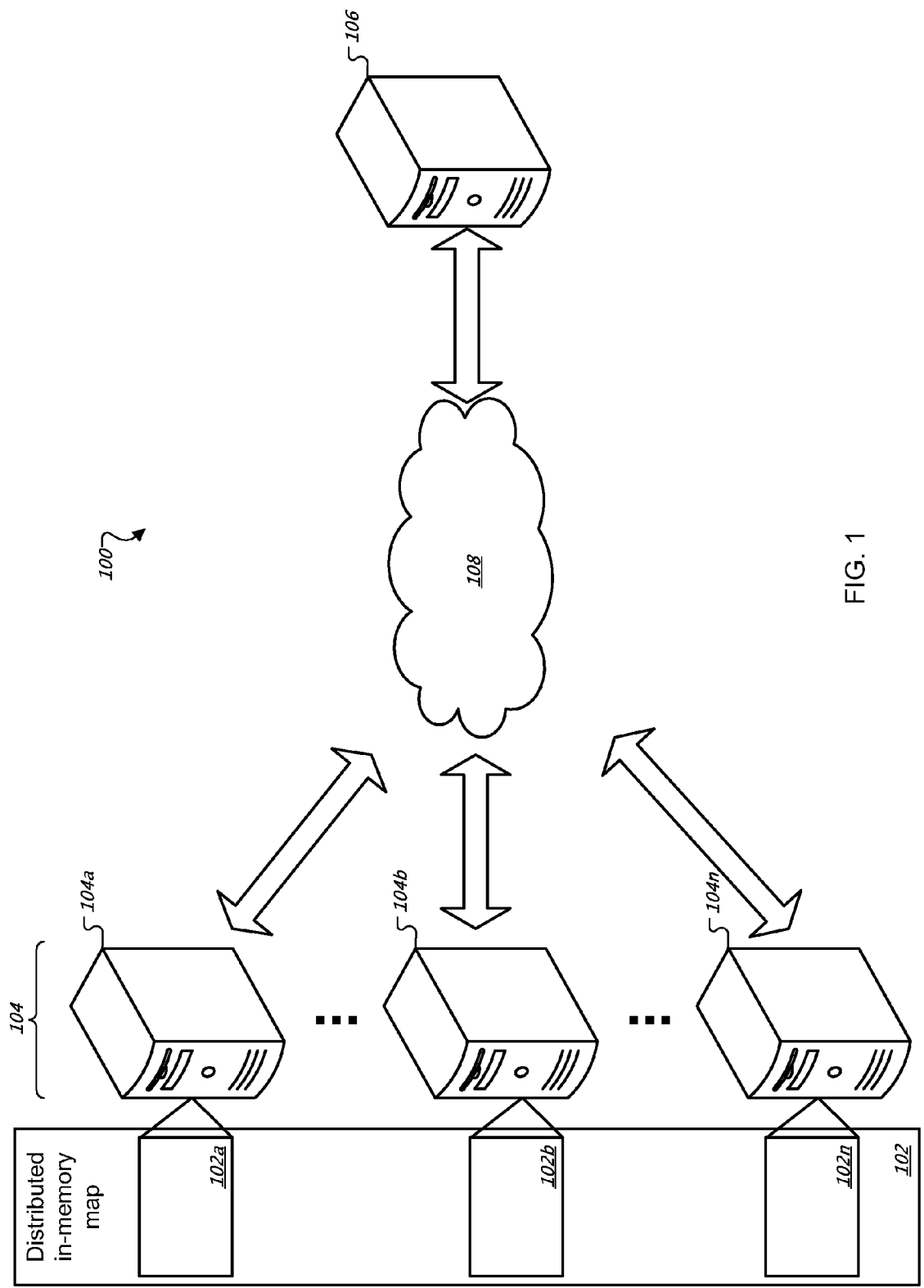
FIG. 1 is a block diagram of an example data warehouse system.

Referring to FIG. 1, a schematic representation of a data warehouse system 100 is shown. The data warehousing system 100 includes a distributed map 102, one or more storage systems 104, and an aggregation system 106. In other examples, more than one aggregation system 106 can be included in the system 100. The distributed map includes mapping information that can be used to aggregate data. The distributed map 102 can be partitioned into multiple portions. The portions are stored on the multiple storage systems 104a-n. Partitioning the mapping information, i.e., the aggregation map, allows for aggregation mapping of large volumes of data and/or sparse data. That is, if a conventional aggregation map, such as an array, is used to map large volumes of data, one machine may be unable to store and effectively manage the aggregation map. Partitioning the map, which allows for the aggregation map to be stored across multiple machines, e.g., storage systems 104a-n, removes limitations on the size of the aggregation map.

In one implementation, the distributed map is an in-memory-map distributed across the multiple machines 104a-n, which can improve response time. In another implementation, the distributed map is implemented as distributed disk-based maps across the multiple machines 104a-n, which can increase per-machine capacity.

In some implementations, the data warehouse system 100 includes an online analytical processing (OLAP) system to process data. One example of the OLAP system is a Datacube system of Google, Inc. in Mountain View, Calif.

The aggregation system 106 can communicate with the storage system 104 over a network 108, for example, but not limited to, one or more local area networks (LANs) or a wide area network (WAN), e.g., the Internet. The aggregation system 106 can query the storage system 104 to request mapping information included in the distributed map 102. The aggregation system 106 can use the mapping information provided in response to the query to determine relationships between data stored in the data warehouse.

Figure 2:
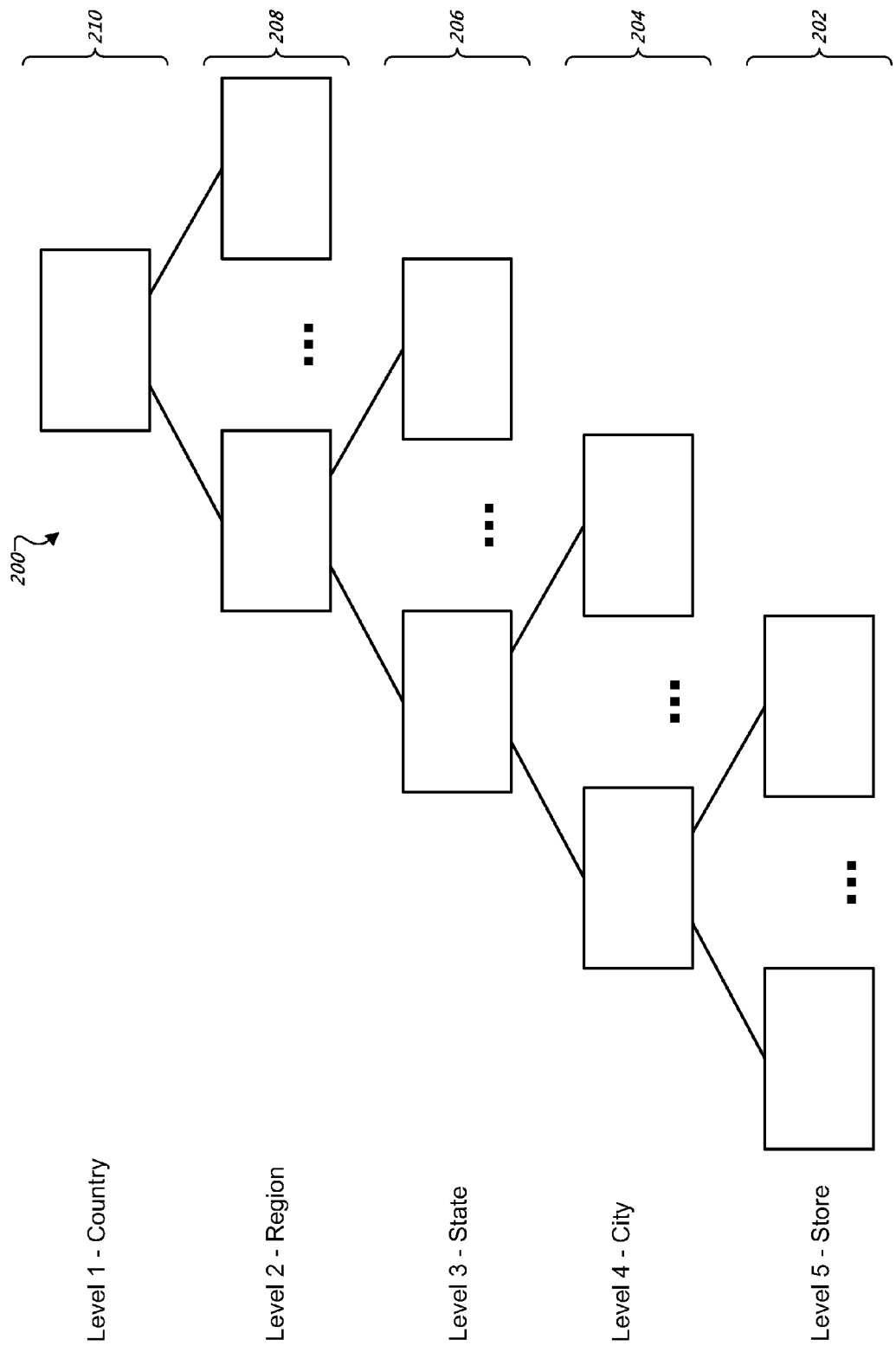
FIG. 2 is a block diagram of an example data hierarchy.

In one implementation, the distributed map 102 includes a mapping from a first dimension level in a hierarchy (referred to herein as a "drilldown level") to a second dimension level in the hierarchy (referred to herein as a "roll-up level"). Referring to FIG. 2, an illustrative example of a hierarchy of data 200 is shown. This illustrative example shall be used to further explain the techniques and systems described herein. However, it should be understood that a hierarchy can be of a different configuration, and this is but one illustrative example. In this illustrative example, the data to be housed and aggregated by the system 100 relates to sales data for stores. Each store has a store identifier (ID) and is in level 5 202 of the example hierarchy 200. Each store is located in a city, and the cities each have a city ID and are in level 4 204 of the hierarchy 200. Each city is located within a state, and each state has a state ID and is in level 3 206 of the hierarchy 200. Each state is included in a region, e.g., "Western USA", and each region has a region ID and is in level 2 208 of the hierarchy 200. Each region is located within a country, and each country has a country ID and is in level 1 210 of the hierarchy 200. If the aggregation system 106 is aggregating data from the store level 202 to the city level 204, the store level 202, i.e., level 5, is the drill-down level and the city level 204, i.e., level 4, is the roll-up level. That is, sales data from the store level 202 is "rolled-up" to the city level 204. The aggregation map therefore maps store IDs from level 5 to city IDs in level 4.

Figure 3:
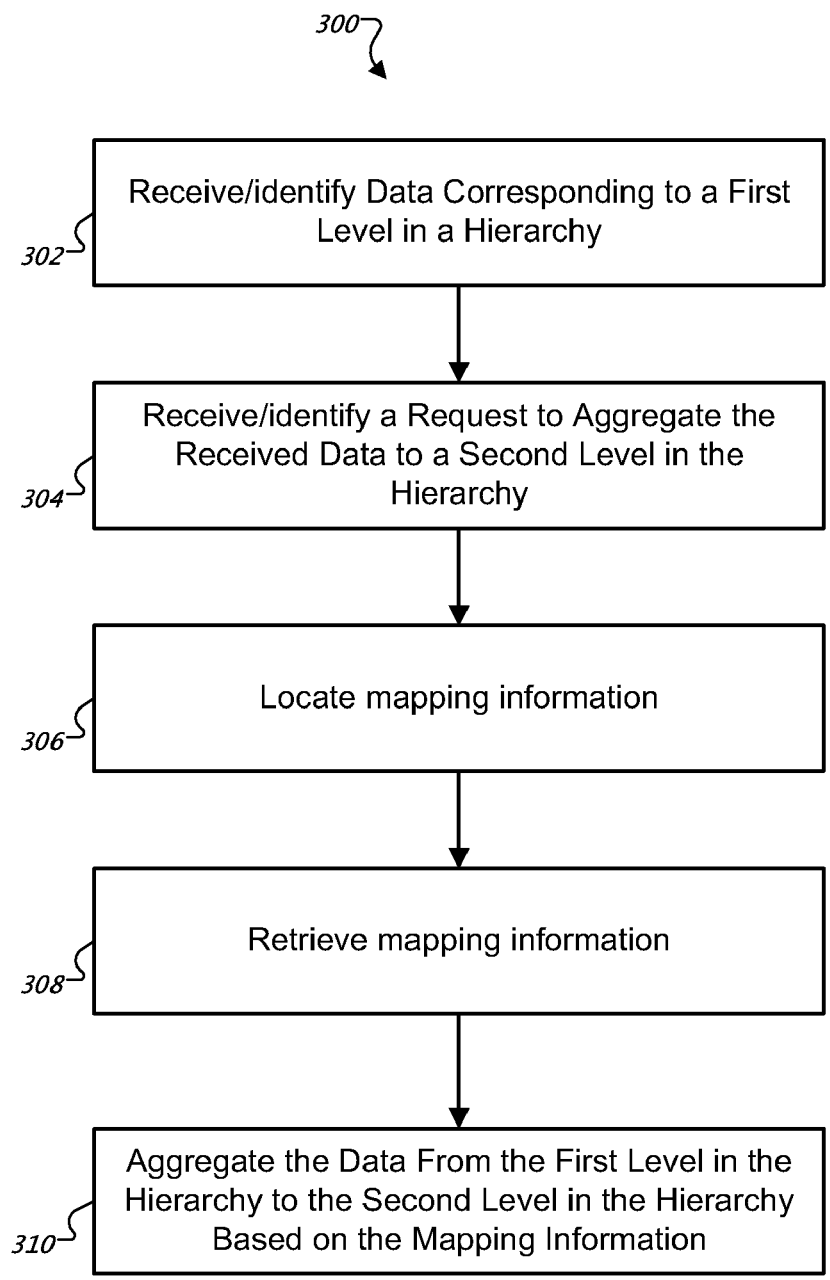
FIG. 3 is a flow chart showing an example method for aggregating data.

Referring to FIG. 3, a flow chart showing a process 300 for aggregating data is shown. For illustrative purposes, the process 300 shall be described in reference to the hierarchy shown in FIG. 2, although it should be understood the process 300 can be applied to data of different configurations than the hierarchy of FIG. 2, which is but one example. Data corresponding to a first level in a hierarchy is received/identified (Step 302). For example, sales data relating to a store, i.e., at store level 5 202, can be received by an aggregation system. In the example, the store ID is 3201. A request to aggregate the received data to a roll-up level in the hierarchy is received/identified (Step 304). Receiving the request can include various means for receipt including but not limited to: receiving the data and automatically aggregating upon receipt of data corresponding to level 5 202 based on an earlier instruction; receiving an explicit request to roll-up the data; or aggregating the data corresponding to level 5 202 to a roll-up level at a predetermined time interval. In this illustrative example, the request is to aggregate the store level data 202 to the city level 204. That is, to roll-up the level 5 data into level 4 data.

In order to determine what city the store having store ID 3201 is located in, the aggregation map is used. That is, the partitioned aggregation map stored in the distributed map is used to determine the city ID corresponding to the city in which the store having store ID 3201 is located. In one implementation, before a request can be sent to the appropriate storage system for the mapping information, the relevant portion of the aggregation map is identified (e.g., the aggregation system determines which storage system has the needed portion of the aggregation map) (Step 306). This can be more efficient than sending a request to every storage system, when only one storage system typically includes the needed mapping information. In one example, the suffix of the store ID identifies the storage system that includes the mapping information for the particular store. That is, in this illustrative example, the "01" included at the end of the store ID "3201" identifies that storage system "01" houses the needed mapping information. Thereafter, the relevant portion of the aggregation map is retrieved (e.g., a request for the mapping information that maps from level 5 202 to level 4 204 for the store ID in question is sent to the appropriate storage system, i.e., storage system 01 (Step 308). Alternatively, as mentioned above, the request can be sent to all the storage systems included in the system, however, the increased number of requests can impact on the efficiency of the system.

The aggregation system can receive the mapping information requested in response to the request sent to the storage system. In this illustrative example, the response indicates that store ID 3201 is mapped to city ID 2205, which corresponds to Redwood City. That is, the store having store ID 3201 is located in Redwood City, which has city ID 2205. Continuing with the method, the aggregation of the data can be performed (e.g., the aggregation system can now aggregate the sales data received for store ID 3201 into the sales data for city ID 2205) (Step 310). In this example, the sales data provided at the store level is rolled up to the city level in accordance with the mapping provided by the partitioned aggregation map.

To continue the example, consider a second aggregation request to aggregate the sales data at the state level. The aggregation system must now determine what state ID in level 3 206 is mapped to the city ID 2205 in level 4 204. Again, the suffix "05" can be used in this example to determine which storage system to send a request to for the needed mapping information, i.e., storage system 05. The request is sent and the mapping information received. In this example, as Redwood City is located in the state of California, the state ID 3109 corresponding to the state of California is provided. The aggregation system can now roll-up the sales data aggregated at the city ID level, i.e., level 4 204, into the state level 3 206 for the state ID 3109.

Referring again to the example system 100 shown in FIG. 1, in one implementation, the aggregation system 106 generates a remote procedure call (RPC) during aggregation. Remote procedure calls can invoke a procedure on a remote system, and are well known in the art. For example, the aggregation system 106 can invoke an RPC on one or more storage systems 104*a-n* to retrieve mapping information included in the distributed map 102. Once the data is aggregated, it can be made available to the requester (e.g., a user or an autonomous computing system). In some implementations, the aggregation data can be displayed on a display device, saved to a file, used to generate a report, printed on a printer, or combinations thereof, to name a few examples.

In some implementations, the aggregation request may originate from an outside source (e.g., a user, or another computing system) or the data aggregation can be initiated at regular predetermined time intervals (e.g., every 15 minutes, or every hour), to name a few examples. As another example, the aggregation request can be triggered by the system 100 based on a received event (e.g., receiving new information from an outside source). That is, the aggregation server 106 can process aggregation requests in either an offline aggregating fashion or an online aggregating fashion.

Used herein, "offline aggregation" is aggregation that is triggered by an event, such an elapsed time interval, or receipt of new information. For example, if new information corresponding to sales data is received for one or more stores, offline aggregation can aggregate the received information based on the type of item sold, the time of day, the amount of revenue generated by the sale, or aggregated based on other criteria. Moreover, the aggregation server 106 can also aggregate the received information into other data sets. For example, the received sales data for the stores (e.g., level 5 202) can also be aggregated into sales data for a city (e.g., level 4 204), for a state (e.g., level 3 206), for a region (e.g., level 2 208), or a country (e.g., level 1 210). In addition, the aggregation can be done incrementally. For example, the sales data can be first aggregated at the store level 202 then aggregated at the city level 204, using information aggregated at the store level 202. Then, the sales data at the city level 204 can be aggregated at the state level 206, and finally the sales data aggregated at the state level 206 can be aggregated at the region level 208.

Used herein "online aggregation" is aggregation that is triggered by a user initiated data query, or a data query initiated by another computing system, to name two examples. For example, a user of the system 100 can query the amount of sales generated by a particular store (e.g., level 5 202), or a particular city (e.g., level 4 204), or both. When the query is processed, the aggregation server 106 accesses the relevant data and aggregates as appropriate. For example, if the query requests information corresponding to a particular city, the aggregation server 106 aggregates the sales information for the requested city. If, for example, another query requests information corresponding to a particular state, the previously aggregated sales information can be aggregated into one or more states based on the mapping provided by the distributed map 102. For example, accessing the distributed map 102 provides a mapping from the city (i.e., the drilldown level) to the appropriate state (i.e., the roll-up level). If, for example, the city data has not been previously aggregated, then the aggregation server 106 can aggregate the city data before it is aggregated with the state data. Used herein, an "aggregation" refers generally to either an online aggregation or an offline aggregation.

In some implementations, the distributed map 102 is partitioned into substantially similar sized portions. For example, portions 102a through 102n can each include $1/n^{th}$ of the distributed map 102. In some implementations, the portions 102a through 102n can be implemented as one or more portions of a distributed hash table that can be used to hash the mapping data stored by the distributed map 102. Moreover, the data can be hashed in such a way that allows the aggregation server 106 to determine where the data resides. In one implementation, the ID corresponding to a dimension level can be parsed and used to determine which portion of the distributed map 102 contains the mapping information. For example, the last two digits "01" of the store ID 3201 can be used to specify a portion of the distributed map that includes the corresponding roll-up mapping within the distributed map 102.

In some implementations, map portions 102a through 102n are replicated across more than one machine. For example, two or more machines can store distributed map portion 102a. This approach can reduce the latency of aggregation requests. For example, if more than one machine includes a portion of the map, then if a machine is busy processing a previous aggregation request, other machines are available to process new aggregation request on the same map portions.

In some implementations, the distributed map 102 can be periodically recreated to include new data. For example, a new store can be added to the data warehousing system 100. The corresponding new store ID and mapping information to other data included in a data hierarchy can be added to the map 102. For example, the drilldown level store ID for the store can be mapped to a corresponding city ID, state ID, region ID and country ID, or other roll-up levels, to name a few examples. In some implementations, the distributed map can be recreated by loading a file that specifies the information in the distributed map and the information stored in the various partitions (e.g., portions 102a through 102n).

In some implementations, multiple requests for mapping information sent to the storage systems 104a-n can be batched. Batching can improve performance because it can reduce the number of computationally expensive RPCs that the system 100 processes. For example, a series of requests batched together can use a single RPC to retrieve the information, instead of an RPC for each request.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Figure 4:
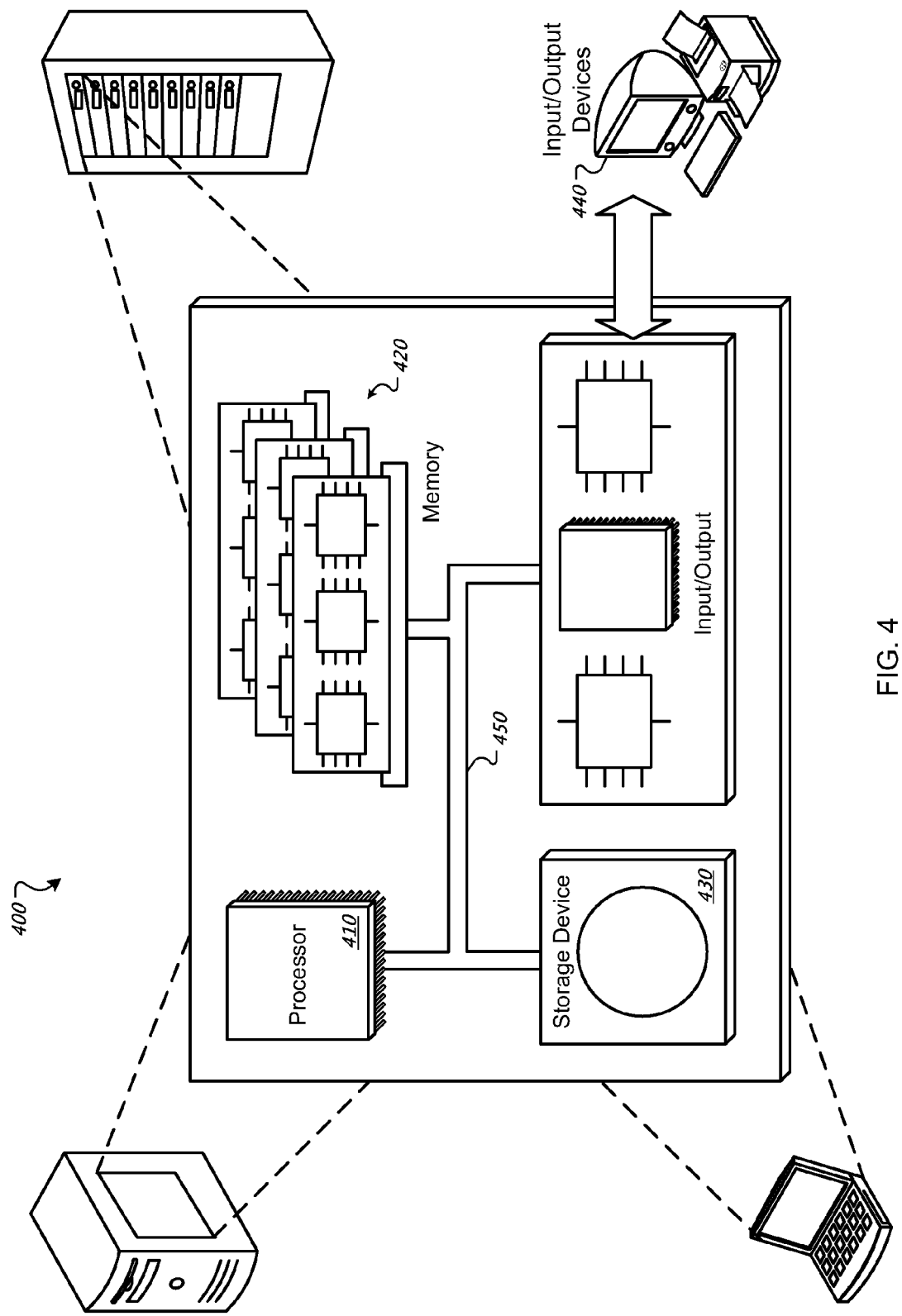
FIG. 4 is a schematic diagram of an example computer system.

Referring now to FIG. 4, a schematic diagram of an example computer system 400 is shown. The system 400 can be used for the operations described in association with the method 300 in FIG. 3, according to one implementation. For example, one or more of the systems 400 can be used to implement a storage server 102, and/or an aggregation server 106 (see FIG. 1).

The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440. In some embodiments, a parallel processing set of systems 400 connected over a network may be employed, clustered into one or more server centers.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 includes a keyboard and/or pointing device. In another implementation, the input/output device 340 includes a display unit for displaying graphical user interfaces.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method comprising:
providing a distributed map that resides on a plurality of devices that maps data from a first dimension level in a hierarchy to a second dimension level in the hierarchy, wherein the data comprises a plurality of data items each associated with an identifier and the distributed map is partitioned into a plurality of portions and each portion resides on one of the plurality of devices;
for each data item, sending a request to a particular one of the plurality of devices to obtain a particular portion of the distributed map that maps the data item from the first dimension level to the second dimension level, wherein the request is sent to the particular device based on the identifier associated with the data item; and
aggregating data from the first dimension level to the second dimension level based on the mapping.

2. The method of claim 1, wherein sending a request to the particular device comprises including the request in a batch of requests corresponding to a plurality of data items sent together to the particular device.

3. The method of claim 1, further comprising:
receiving new data in the first dimension level of the hierarchy; and
periodically recreating the distributed map to include new data.

4. The method of claim 1, wherein the distributed map comprises distributed hash tables.

5. The method of claim 1, wherein the plurality of devices comprise a plurality of different physical devices.

6. The method of claim 1, wherein the plurality of devices comprise a plurality of different logical devices.

7. The method of claim 1, wherein the distributed map comprises a distributed in-memory-map.

8. The method of claim 1, wherein the distributed map comprises a distributed disk-based map.

9. A system comprising:
a processor;
a storage device coupled to the processor and configurable for storing instructions, which, when executed by the processor, cause the processor to perform operations comprising:
providing a distributed map that resides on a plurality of devices that maps data from a first dimension level in a hierarchy to a second dimension level in the hierarchy, wherein the data comprises a plurality of data items each associated with an identifier and the distributed map is partitioned into a plurality of portions and each portion resides on one of the plurality of devices;
for each data item, sending a request to a particular one of the plurality of devices to obtain a portion of the distributed map that maps the data item from the first dimension level to the second dimension level, wherein the request is sent to the particular device based on the identifier associated with the data item; and
aggregating data from the first dimension level to the second dimension level based on the mapping.

10. The system of claim 9, wherein instructions to send a request to the particular device comprise including the request in a batch of requests corresponding to a plurality of data items sent together to the particular device.

11. The system of claim 9, further comprising instructions which, when executed by the processor, cause the processor to perform operations comprising:
receiving new data in the first dimension level of the hierarchy; and
periodically recreating the distributed map to include new data.

12. The system of claim 9, wherein the distributed map comprises distributed hash tables.

13. The system of claim 9, wherein the plurality of devices comprise a plurality of different physical devices.

14. The system of claim 9, wherein the distributed map comprises a distributed in-memory-map.

15. The system of claim 9, wherein the distributed map comprises a distributed disk-based map.

16. A computer readable medium having instructions stored thereon, which, when executed by a processor, cause the processor to perform operations comprising:
providing a distributed map that resides on a plurality of devices that maps data from a first dimension level in a hierarchy to a second dimension level in the hierarchy, wherein the data comprises a plurality of data items each associated with an identifier and the distributed map is partitioned into a plurality of portions and each portion resides on one of the plurality of devices;
for each data item, sending a request to a particular one of the plurality of devices to obtain a portion of the distributed map that maps the data item from the first dimension level to the second dimension level, wherein the request is sent to the particular device based on the identifier associated with the data item; and
aggregating data from the first dimension level to the second dimension level based on the mapping.

17. The computer readable medium of claim 16, further comprising instructions which, when executed by the processor, cause the processor to perform operations comprising:
receiving new data in the first dimension level of the hierarchy; and
periodically recreating the distributed map to include new data.

* * * * *